Nov. 29, 1966 YUKIO HIRAMATSU ETAL 3,289,031

HIGH FREQUENCY ELECTRON DISCHARGE DEVICES AND SLOW WAVE STRUCTURES THEREFOR

Filed Jan. 28, 1963 2 Sheets-Sheet 1

INVENTORS
YUKIO HIRAMATSU
NORMAN R. VANDERPLAATS
BY Harry E. Aine
ATTORNEY

INVENTORS
YUKIO HIRAMATSU
NORMAN R. VANDERPLAATS
BY Harry E. Aine
ATTORNEY 3,289,031

HIGH FREQUENCY ELECTRON DISCHARGE DEVICES AND SLOW WAVE STRUCTURES THEREFOR

Yukio Hiramatsu, Los Altos, and Norman R. Vanderplaats, Palo Alto, Calif., assignors to Varian Associates, Palo Alto, Calif., a corporation of California Filed Jan. 28, 1963, Ser. No. 254,268
17 Claims. (Cl. 315—3.5)

Figures 1, 2, 3, 4, 5, 6, 10:
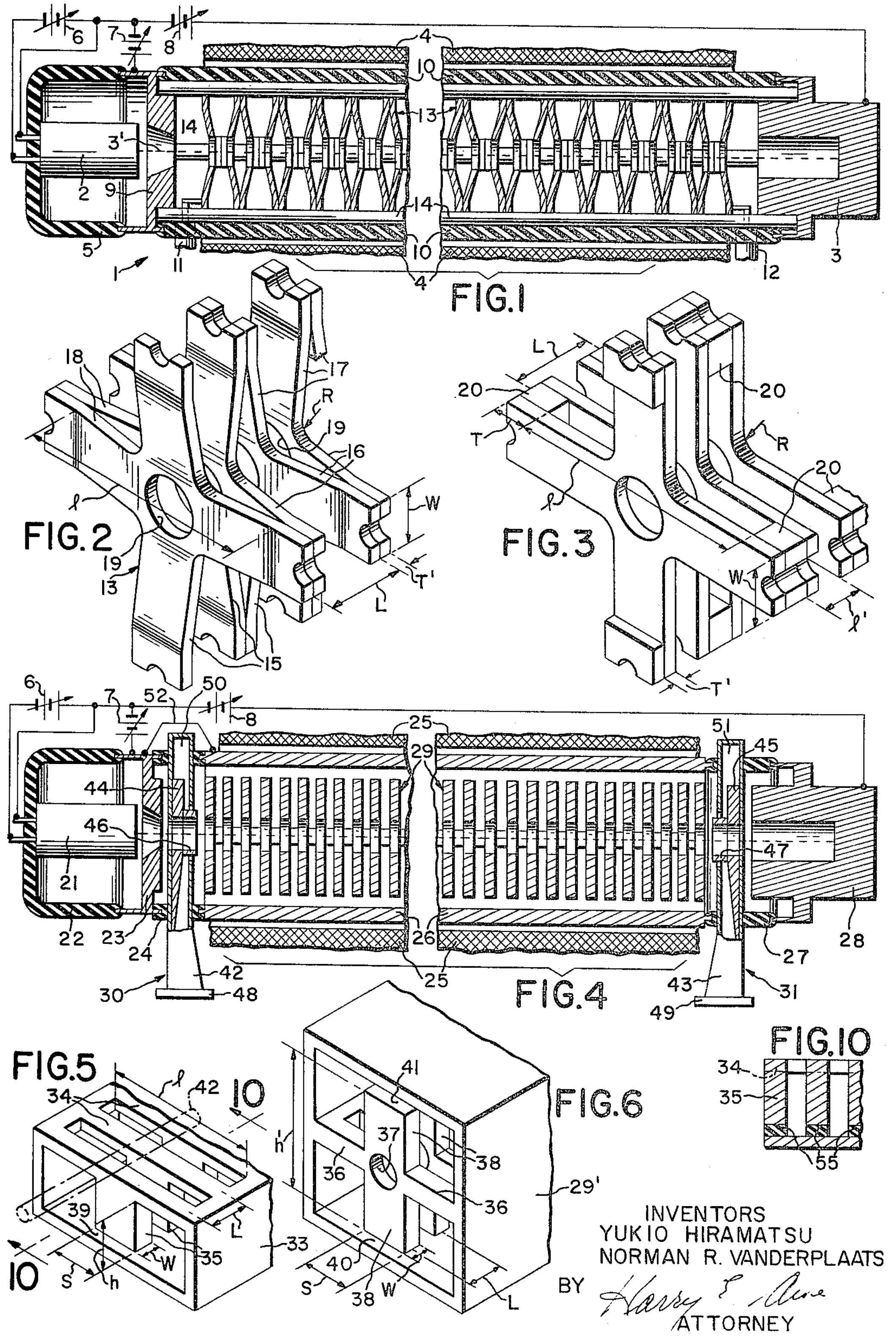

The present invention relates in general to high frequency electron discharge devices and more particularly to traveling wave tubes and interaction structures therefore.

The existing state of the art beam-wave interaction or slow-wave structures utilized in traveling wave tubes provide adequate bandwidth and interaction impedance at lower power levels but such structures are either nonexistent or inadequate at higher power levels with respect to the realization of practical levels of interaction impedance, bandwidth and power handling capacity coupled with simplicity of circuit design.

For example, the helix slow-wave structure provides excellent interaction impedance and wide bandwidth at low beam voltage and low power levels. The main disadvantages of the helix are inability to dissipate power at high levels and the drop off in interaction impedance as the beam voltage is increased.

Coupled cavity type interaction circuits can handle very high power levels but are limited in bandwidth when capacitively coupled or operated as a fundamental forward wave type circuit and are limited in interaction impedance when inductively coupled and operating on one of the forward wave space harmonics of the fundamental backward wave for traveling wave interaction.

Periodically loaded interaction structures appear to offer the most promising solutions at the present level of development of the state of the art. This group of circuits might be said to encompass the strip line, coaxial line, planar conductor and waveguide each of which is loaded by stubs, fins, vanes or slots. These circuits can handle higher power than the helix-type circuits and have reasonable bandwidths.

The invention is concerned with the development of two new periodically loaded type interaction circuits which have the common properties of ease of fabrication with accompanying economic advantages, simplicity of design, high power dissipation capabilities, high interaction impedance and wide bandwidth.

It is therefore a primary object of this invention to provide interaction circuits for use in electron discharge devices such as, for example, the traveling wave tube which are simple in design, easily fabricated, economical to manufacture and which have high power dissipation capabilities, wide bandwidth and high interaction impedance.

A first feature of this invention is the provision of a connected-X line interaction circuit for electron discharge devices such as, for example, the traveling wave tube characterized in its ease of fabrication, simplicity of design and accompanying economic advantages together with the desirable slow-wave circuit properties of high interaction impedance, wide bandwidth and high power dissipation capabilities.

A second feature of this invention is the provision of a vane-slot interaction circuit for electron discharge devices such as, for example, the traveling wave tube, characterized in its ease of fabrication, simplicity of design and accompanying economic advantages together with the desirable slow-wave circuit properties of high interaction impedance, wide bandwidth and high power dissipation capabilities.

Another feature of the present invention is the provision of a connected-X line interaction circuit of the type indicated in the above-mentioned first feature wherein the arms of the individual members of the connected-X line interaction circuit are located in a plane and the mutually opposed arms of adjacent spaced members are conductively connected by spacers in a specified pattern.

Another feature of the present invention is the provision of a vane-slot interaction circuit of the type indicated in the above-mentioned second feature characterized in that the interaction circuit is of the double vane type.

Another feature of the present invention is the provision of a vane-slot interaction circuit of the type indicated in the above-mentioned second feature characterized in that the interaction circuit is of the single vane type.

Still another feature of the present invention is the provision of a tapered ridge waveguide having a coupling ring mounted on the ridge functioning as a coupling means for the R.F. propagated on a vane-slot slow wave structure.

Figures 7, 8, 9:
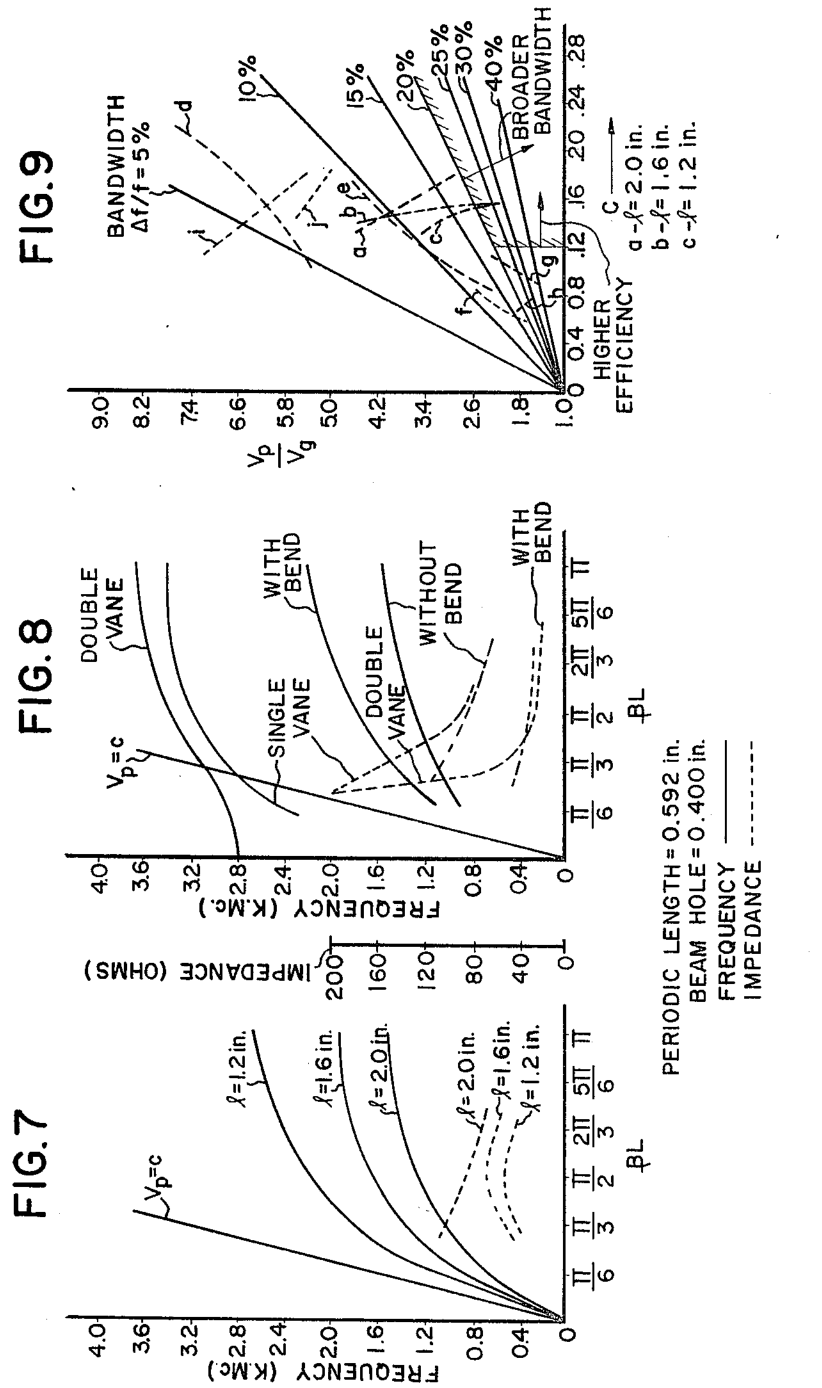

Other features and advantages of the present invention will become apparent upon a perusal of the following specification taken in connection with the accompanying drawings wherein, FIG. 1 is a fragmentary cross-sectional view of a traveling wave tube embodying a bent arm version of the connected-X line interaction circuit, FIG. 2 is a fragmentary perspective view of a typical bent arm version of a connected-X line interaction circuit, FIG. 3 is a fragmentary perspective view of a typical planar version of a connected-X line interaction circuit, FIG. 4 is a fragmentary cross-sectional view of a traveling wave tube embodying a double vane version of a vane-slot interaction circuit, FIG. 5 is a perspective view of a single vane version of a vane-slot interaction circuit, FIG. 6 is a perspective view of a double vane version of the vane-slot interaction circuit, FIG. 7 is an $\omega$-$\beta$ diagram and impedance curve of a planar version of the connected-X line interaction circuit illustrating the effects of variations in arm lengths on the circuit characteristics, FIG. 8 is an $\omega$-$\beta$ diagram and the impedance curve comparing the planar version of the connected-X line interaction circuit with the bent arm version of the connected-X line interaction circuit illustrating the effects on circuit characteristics and also showing a comparison of the single and double vane-slot interaction impedances and $\omega$-$\beta$ characteristics, FIG. 9 is a D-C diagram of connected-X line interaction circuits having the circuit characteristics depicted in FIG. 7 showing a plot of gain parameter C and dispersion parameter $v_p/v_g$ having a number of calculated bandwidths plotted thereon and similar curves of other slow wave circuits including the vane-slot type presented for purposes of comparison, and FIG. 10 is a cross-sectional view along lines 10—10 of FIG. 5 showing a loaded vane-slot structure.

Turning our attention to FIG. 1 there is shown an exemplary traveling wave tube 1 having a conventional electron gun structure 2 capable of generating a pencil-shaped electron beam 3' along the axis of the tube to a collector structure 3. A solenoid 4 is shown as the focusing means for the beam, however other conventional focusing schemes may be utilized herein and are so contemplated. Gun structure 2 is preferably mounted in cup-shaped insulator section 5. Tube operating potentials may be supplied by power supply sources 6, 7, 8 to the gun structure 2, including anode means 9 and collector 3, respectively. It is to be understood that if pulsed operation is desired as opposed to continuous wave operation then a pulsed power supply will be required. Glass or ceramic tubular envelope 10 together with suitable vacuum sealed R.F. input 11 and output 12 couplers form a complete vacuum sealed structure.

The interaction structure 13 is preferably supported therein by means of refractory dielectric rods 14 as of sapphire which may be brazed or otherwise fixedly attached to metallic members 3 and 9.

A detailed discussion of the theory of traveling wave tube interaction will not be presented herein since the literature on this subject is profuse and any description herein would only be repetitious. It should suffice to state that an energy interchange occurs between the electron beam and the R.F. energy on the interaction structure. The interaction structure 13 embodied in FIG. 1 is shown in greater detail in FIG. 2 and will be discussed in detail hereinafter.

FIG. 2 depicts what is hereinafter referred to as a bent connected-X line interaction circuit having the desired slow wave structure characteristics of circuit simplicity, high interaction impedance, wide bandwidth and high power handling capabilities coupled with ease of fabrication. As can be seen upon examination of FIG. 2 a series of conductive plates 13 of generally X-shaped or cruciform configuration is depicted therein. The plates 13 can be referred to as a connected-X line interaction circuit. Each of said X-shaped plates has four arms 15, 16, 17, 18. Each arm is space rotated 90° with respect to the adjacent arms. Proceeding clockwise from arm 17, it is seen that adjacent arms of each plate are bent in opposite directions out of the plane of the individual plate as defined by the plane of the defining boundary of a central aperture 19 within each plate. The central aperture is centered at the point of intersection of the axis of the four arms. A plurality of plates are stacked together as shown in FIG. 2 with two 180° space oriented arms of each plate being conductively connected with two mutually opposed 180° space oriented arms of an adjacent plate spaced therefrom. The spacing between adjacent plates is a function of the degree of bending of the arms of adjacent plates. The resultant structure can be of any desired longitudinal length or transverse width depending on the number of plates and the degree of bending of the arms of each of the plates and the length of the arms of each plate and the desired frequency range of operation. These parameters can be varied as desired. A periodic length for this circuit is indicated by reference characteristic L. The upper cut-off frequency of the connected-X line circuit is controlled by varying the length of the $l$ dimension which is defined hereinafter. As this length is increased the upper cut-off frequency is decreased. The lower cut-off frequency for a periodic structure of this nature is zero.

FIG. 3 shows a non-bent or planar version of the connected-X line interaction circuit wherein spacers are used to connect 180° space oriented arms of each plate to the mutually opposed 180° space oriented arms of adjacent plates as shown. The spacers can be of any suitable conductive material and are either brazed, welded or otherwise conductively connected to the arms of the plates to form an integral structure. The arms of the bent version connected-X line structure of FIG. 2 are similarly brazed, welded or otherwise suitably joined together to form an integral structure. The materials used for the slow wave structures may be of any of the conventional types such as stainless steel, copper, tungsten, molybdenum, colombium and the like and are preferably formed by stamping and forming operations and thus are extremely easy to fabricate and assemble in contra-distinction to such complex circuit configurations of the prior art as the contrawound helix, for example, which requires tedious machining operations etc.

In FIGS. 7 and 8 are depicted typical impedance curves and $\omega$-$\beta$ diagrams of the connected-X line interaction structures of the types shown in FIGS. 2 and 3. Illustrations of the varying effects of the arm lengths of this type structure and employing the bent arm version as opposed to the planar version and the resultant effects thereof on the dispersion and impedance characteristics are also shown in FIGS. 7 and 8. The following cold test dimensional parameters were chosen for the circuits defined by the curves of FIGS. 7 and 8. A periodic length L of 0.592 in. and a beam hole diameter of .400 in. are common to both FIGS. 7 and 8. The parameter $l$ is defined as the total arm length between the inner opposed faces of the spacers 20 as shown in FIG. 3. The parameter $l$ for the bent version of FIG. 2 can be defined as the distance between the shorted portions of the arms as shown. The arm width W for the curves of FIGS. 7 and 8 was .400 in., the spacer thickness T was .200 in., the radius of curvature R as seen in FIG. 3 was .200 in., the distance $l'$ was .300 in. and the arm thickness T' was .094 in. It is seen upon examination of FIG. 7 that interaction impedances of over 50 ohms together with wide bandwidths as shown in FIG. 9 are realized with the planar connected-X line version and that the interaction impedance is increased as $l$ is increased while $\pi$ mode frequency decreases as $l$ increases. In FIG. 8 the effect of bending the arms of a planar version of the connected-X line structure having an $l$ of 2 in. is shown. As can be readily seen the $\pi$ mode frequency is increased by a factor of about 1.4 while the interaction impedance is decreased by a factor of 2. Varying the beam hole diameter from .400 in. to .600 in. has the effect of lowering the interaction impedance slightly and raising the $\pi$ mode frequency slightly for a preselected $l$ of 1.2 in. Thus it can readily be seen that the planar and bent connected-X line interaction structures have the additional advantages of design flexibility such that good control of circuit characteristics such as interaction impedance and bandwidth is easily achieved by varying one or a combination of dimensional parameters of the structure in a predetermined manner with predictable results thereby facilitating the design of interaction structures capable of a wide range of performance while maintaining a single basic circuit pattern.

In FIG. 9 a D-C diagram is shown for a planar connected-X line interaction circuit of the type shown in FIG. 3 and having the circuit characteristics of the structures of FIG. 7. The ordinate of FIG. 9 is scaled in the ratio $v_p/v_g$ or (D) dispersion whereas the abscissa is scaled in terms of gain parameter C.

It can be shown that a good approximation for the small-signal bandwith $$\frac{\Delta f}{f}$$

for traveling wave tubes, generally defined as a ratio of the frequency band, over which the tube gain is within 3 db below the maximum value, to the peak freqeuncy of the band, is the following approximation equation:

(1)

$$\frac{\Delta f}{f}=\frac{v_p}{u_o}\frac{C}{\left(\frac{v_p}{v_g}-1\right)}\left[2-\sqrt{QC}\left(1-\frac{C}{0.35}\right)\right]\left(\frac{30}{G}\right)^{1/2}$$

where $$\frac{\Delta f}{f}=\text{db bandwith}$$

$v_p$=phase velocity of the circuit
$v_g$=group velocity of the circuit
$u_o$=beam velocity
$G$=maximum gain in db.
$C$=gain parameter
$QC$=space charge parameter now assuming $$G=30$$
$$v_p=u_o$$
$$QC<<1.0$$

we can simplify Equation 1 to $$\frac{\Delta f}{f} = \frac{2C}{\frac{v_p}{v_g} - 1} \quad (2)$$

and plot various small signal bandwidths on a D-C diagram as shown in FIG. 9. As indicated in the diagram of FIG. 9 the shaded area is indicative of a desirable region of traveling wave tube operation with broad bandwidth and high efficiency. Now assuming a beam perveance of $1.0 \times 10^{-6}$ amp/volts$^{3/2}$ for a pencil beam the plots of D-C curves for various planar connected-X line interaction circuits having $l$ parameters of 2.0, 1.6 and 1.2 in. are shown in FIG. 9. The dispersion parameter $v_p/v_g$ is taken from the $\omega$-$\beta$ diagram of FIG. 7 while the gain parameter can be calculated from the equation $$C^3 = \frac{KI_o}{4V_o}$$

where $K$=interaction impedance
$I_o$=beam current
$V_o$=beam voltage and K is defined by $$K = \frac{E^2}{2\beta^2 P}$$

wherein $E$=electric field strength effective for interaction
$P$=total power flow in circuit
$\beta$=phase shift in circuit It is readily seen that high efficiency coupled with broad bandwidth is obtained with planar connected-X line interaction circuits.

For purposes of illustration the D-C plots of other high power interaction structures (*d*)–(*h*), assuming again a beam perveance of $1.0 \times 10^{-6}$ amp/volt$^{3/2}$, are shown in FIG. 9. Reference letter (*d*) refers to a cloverleaf circuit; (*e*) refers to a centipede circuit; (*f*) refers to a Hines circuit; (*g*) refers to a coupled cavity circuit; and (*h*) refers to a ring and bar circuit.

The cloverleaf circuit is discussed and described in a paper by J. A. Ruetz and W. H. Yocom, "High Power Traveling Wave Tubes for Radar Systems," I.R.E. Transactions on Military Electronics, April 1961, pages 39–45. The centipede circuit is discussed and described in a paper by M. Chodorow, A. F. Pearce, and D. K. Winslow, "The Centipede High Power Traveling-Wave Tube," ML Report No. 695, Microwave Laboratory, Stanford University, May 1960. The Hines circuit is discussed and described in a report by B. Arfin, "A Travelling-Wave Tube Using Coupled Coaxial Cavities," Technical Report No. 220–1, Stanford Electronics Laboratories, Stanford University, October 1956. The coupled cavity circuit is discussed and described in a paper by J. E. Etter, "S-Band 250 kw. Traveling-Wave Tube," Final Progress Report, Electron Tube Division, Hughes Aircraft Company, Culver City, California, April 1958–July 1958. The ring and bar circuit is discussed and described in a paper by W. R. Ayres and P. T. Kirstein, "Theoretical and Experimental Characteristics of Connected-Ring Structures for Use in High Power Travelling-Wave Tubes," ML Report No. 358, Microwave Laboratory, Standford University, January 1957.

It is seen that none of the above-mentioned interaction circuits (*d*) to (*h*) compares with the planar connected-X line interaction circuit with reference to desired efficiency and bandwidth characteristics.

In FIG. 4 an illustrative traveling wave tube employing a double vane-slot slow wave interaction circuit is shown. The tube comprises an electron gun structure 21 supported in insulator cup-shaped section 22, and includes anode means 23, insulating member 24, conductive shell 26, insulator member 27, collector structure 28 and R.F. couplers 30 and 31. The R.F. couplers 30, 31 are tapered waveguide sections 42, 43 having impedance matching tapered ridge sections 44, 45 and coupler rings 46, 47 mounted on the ridge sections. The central axis of the coupler rings is aligned with an aperture in each of said tapered ridges to permit beam passage. Suitable vacuum sealed waveguide windows 48, 49 and resonant cavity sections 50 and 51 complete the coupler units. A solenoid 25 is shown as the beam focusing means however, any of the other conventional focusing schemes may equally advantageously be employed. The slow wave structure 29 shown in FIG. 4 is of the double vane-slot type as better seen in FIG. 6. A single vane-slot version is shown in FIG. 5. Both the single vane-slot and the double vane-slot interaction circuits have the fundamentally useful properties of high interaction impedance, with fairly wide bandwidths coupled with good power dissipation capabilities. The single vane-slot version of FIG. 5 comprises a trough waveguide 33 of a conventional conductive material having a series of bar or rod olike conductive elements 34 extending across the width of the guide and periodically spaced thereon. Each element 34 has a vane 35 depending therefrom and preferably centrally located thereon and extending into the guide 33.

The double vane-slot version depicted in FIG. 6 comprises a rectangular waveguide 29 having a series of bar or rod like conductive elements 36 extending across the width of the guide centrally disposed therein and periodically spaced along the longitudinal extent of the guide. Each of the elements 36 has a centrally disposed aperture 37 functioning as a passage for an electron beam and a double vane 38 depending therefrom and extending across the height of the guide to define a cruciform configuration. A relatively small gap 39 in the case of the single vane-slot version of FIG. 5 and two relatively small gaps 40, 41 in the case of the double vane-slot version of FIG. 6 are left between the tips or end portions of vanes 35 and 38 respectively and the opposing internal waveguide walls.

The interaction circuits of FIGS. 5 and 6 can be effectively used in conjunction with a pencil electron beam 42 either traversing the elements 34 as shown in FIG. 5 or with a pencil electron beam directed through the aperture 37 of FIG. 6. Alternatively because of the increased interaction impedance at the vane tips a sheet beam could equally advantageously be employed in FIG. 5 or 6.

The vane-slot interaction circuits of FIGS. 5 and 6 have the common properties of ease of construction and simplicity of design. Quite obviously a simple punching or stamping operation could be used to shape the desired configuration and laminated fabrication techniques employed to build the complete circuit. Of equal importance is the ease of control of circuit characteristics which may be achieved by varying the gap height and vane width and thickness. For example, the interaction impedance is readily controlled by variation of the vane width and thickness. Further control of the circuit characteristics can be achieved by positioning dielectric loading material in the gaps between the vane tips and the opposing waveguide walls. This loading serves to make the circuit more rugged and to lower the circuit velocity by reducing the phase velocity and thus allowing operation at reduced operating voltages which is quite desirable for C.–W. operation and/or operation at very high frequencies. Suitable material for loading the gaps is (by way of example a commercially available material such as) alumina ceramic. FIG. 10 shows a typical vane-slot interaction structure with loading material 55 at the gaps.

A periodic length for the vane-slot slow wave structure is indicated by the reference numeral L. The upper cut-off frequency for the vane-solt slow wave circuit is essentially a function of the slot length $l$, the vane height $h$ and the vane width S, as shown in FIG. 5 while the lower cut-off frequency is determined by the waveguide internal dimensions.

A typical exemplary structure used to obtain the curves of FIGS. 8 and 9 for the single and double vane-slot circuits had the following dimensional parameters; vane height $h$=1.25 in.; vane thickness $w$=.094 in.; periodic length $L$=.300 in.; slot length $l$=2.620 in.; vane width $S$=.640 in. The vane height $h'$ from tip to tip in the case of the double vane-slot structure was 2.856 in.

FIG. 8 depicts curves showing the interaction impedance obtained for the single vane-slot and double vane-slot slow wave structures having the above-mentioned dimensional parameters. Also shown in FIG. 8 are typical $\omega$-$\beta$ curves for the single and double vane-slot interaction structures having the above-indicated dimensional parameters.

Curves $i$ and $j$ in the D-C diagram of FIG. 9 depict the characteristics of exemplary double and single vane interaction circuits of the vane-slot type. It is apparent that the vane-slot interaction circuits have particularly desirable efficiency characteristics at low beam voltages and also combined excellent efficiency and bandwidth properties at higher beam voltages.

The slow wave structures of the present invention have been particularly described with reference to use as traveling wave tube interaction circuits. However it is to be noted that they may equally advantageously be employed in electron discharge devices operated as backward wave oscillators, amplifiers or klystrons and may also find useful application in crossed-field devices such as the magnetron. The operating frequency range of the connected-X line interaction circuits and the vane-slot interaction circuits and the vane-slot interaction circuits encompass the entire microwave spectrum. It is to be noted that not data for power dissipation has been presented. This, of course, is due to the fact that power dissipation in circuits of this type is a function of beam interception and R.F. circuit losses. Thus, theoretically, if a perfect beam could be obtained without any beam interception on the interaction structure there would be no necessity for providing an interaction structure capable of high power dissipation assuming, of course, other factors such as R.F. losses are not too great. However, in practice, beam interception does occur and the connected-X line structure and vane-slot structure are particularly suited, because of their dimensional parameters and the flexibility of these dimensional parameters, to handle high power dissipation as opposed to the helix derived structures for example wherein power dissipation is extremely limited. The ring and bar structure has the highest power dissipation capabilities of the helix derived family of slow wave structures and a stub supported cooled ring and bar circuit at S band frequencies operating at from 100K watts peak and 20K watts average power has been constructed. The connected-X line interaction circuit of the present invention would be capable of higher power operation for S band operations. Similarly the connected-X line interaction circuit should be able to operate at higher powers over the rest of the microwave spectrum than any presently known ring and bar circuit. Similar advantages with respect to power dissipation are found also in the vane-slot structures in the 100K watt peak and above range of operation.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An electron discharge device comprising, (a) an electron gun adapted and arranged to generate an electron beam along a predetermined path, said electron gun being positioned at one end of said path, (b) a collector structure positioned at the other end of said path, (c) a slow wave structure positioned along said predetermined path, said slow wave structure having a generally X-shaped transverse cross-sectional area defined by a plurality of axially spaced cruciform shaped members having their major axes lying in a plurality of axially spaced substantially parallel planes extending along and transversely oriented with respect to said predetermined path, each of said cruciform shaped members having an aperture in the central portion thereof for permitting passage of said electron beam traversing said predetermined path, at least two of the diametrically opposed arm members of each of said cruciform shaped members being conductively connected to the axially opposed arm members of an adjacent cruciform member at the peripheral end portions of said arm members.

2. An electron discharge device comprising, (a) an electron gun adapted and arranged to generate an electron beam along a predetermined path, said electron gun being positioned at one end of said path, (b) a collector structure positioned at the other end of said path, (c) a slow wave structure positioned along said predetermined path, said slow wave structure being comprised of a plurality of periodically spaced conductive elements having vanes depending therefrom, said plurality of periodically spaced conductive elements being disposed within a hollow waveguide member with the respective end portions of each of said plurality of periodically spaced conductive elements being physically coupled to the interior walls of said hollow waveguide member, said vanes depending from said conductive elements being directed towards the interior walls of said hollow waveguide member and forming a series of gaps therebetween, the central portion of each of said plurality of periodically spaced conductive elements having an aperture therein, said central apertures in said plurality of periodically spaced conductive elements being axially aligned with said predetermined electron beam path.

3. A slow wave structure capable of supporting microwave energy comprising a plurality of periodically spaced generally X-shaped conductive elements, said X-shaped conductive elements each having 4 arms extending from a common central portion, at least two arms of each of said plurality of generally X-shaped conductive elements being conductively connected to two arms of the respective adjacent generally X-shaped conductive elements disposed on the opposite sides thereof, said arms being conductively connected at the respective peripheral end portions thereof.

4. The structure of claim 3 wherein each of said arms of any one of said generally X-shaped conductive elements is space oriented substantially 90° with respect to its adjacent arms.

5. The structure of claim 4 wherein each of said periodically spaced X-shaped elements has an aperture therein, said apertures being centrally located at the point of intersection of the axes of said four arms, said apertures of each of said X-shaped elements being aligned along the longitudinal axis of said slow wave structure.

6. The structure of claim 5 wherein two 180° space oriented arms of each X-shaped element are conductively connected with two mutually opposed 180° space oriented arms of an adjacent X-shaped element at the respective end portions of said arms.

7. The structure of claim 6 wherein said mutually opposed 180° space oriented arms of said adjacent X-shaped elements are connected by means of conductive elements positioned at the end portions of said mutually opposed 180° space oriented arms.

8. A slow wave structure capable of supporting microwave energy comprising a series of periodically spaced conductively connected generally planar X-shaped conductive elements, each of said X-shaped conductive elements having four arms, said arms being space oriented substantially 90° with respect to the adjacent arms of said element, each of said generally X-shaped elements being conductively connected to an adjacent spaced generally X-shaped element at the end portions of mutually opposed 180° space oriented arms of each of said elements.

9. A slow wave structure capable of supporting microwave energy comprising a waveguide having spaced broad and narrow walls, one of said broad walls having a series of periodically spaced transverse slots therein, said slots serving to define a series of periodically spaced elements, said elements having conductive vanes depending therefrom, said vanes being directed interiorly of said waveguide.

10. A slow wave structure capable of supporting microwave energy comprising a waveguide, said waveguide havin a plurality of periodically spaced conductive elements positioned therein said spaced conductive elements being connected at their respective end portions to the interior walls of said waveguide, each of said elements having an aperture therein, said apertures being aligned about the longitudinal axis of said waveguide, each of said elements having a conductive vane depending therefrom, each of said vanes having end portions spaced from the walls of said waveguide thereby defining a series of spaced gaps within said waveguide.

11. The structure of claim 10 wherein solid dielectric loading material is positioned in said gaps.

12. A rectangular waveguide having two pairs of spaced conductive walls said waveguide having a slow wave structure positioned therein, said slow wave structure including a plurality of periodically spaced conductive elements positioned in said waveguide and supported at their respective end portions on opposite side walls of said rectangular waveguide, each of said elements having an aperture therein, said apertures being aligned about the longitudinal axis of said waveguide, each of said elements having conductive vanes depending therefrom, said vanes being substantially perpendicular to the longitudinal axis of each of said elements, said vanes being substantially parallel to each other and having end portions spaced from each of the walls of one of said two pairs of spaced conductive walls thereby defining a series of periodically spaced gaps between said end portions and said waveguide walls.

13. The structure of claim 12 wherein solid dielectric loading material is positioned in said gaps.

14. The device of claim 12 wherein waveguide coupling structures are positioned at the ends of said slow wave structure, said waveguide coupling structures being comprised of apertured waveguides extending transversely across the waveguide wherein the slow wave structure is positioned, each of said waveguide coupling structures having a tapered ridge therein, each of said tapered ridges having an annular coupling ring mounted thereon, and each of said tapered ridges having an aperture therein axially aligned with the central axis of each of said annular coupling rings.

15. A slow wave structure capable of supporting microwave energy comprising a plurality of conductively connected periodically spaced generally planar X-shaped conductive elements, at least three of said periodically spaced elements each having four arms, said arms of each of said three elements being space oriented substantially 90° with respect to the adjacent arms of said element thereby defining periodically spaced X-shaped elements having 90° space oriented arms, each of said arms having an end portion, the arms of each of said three elements being mutually opposed, one pair of mutually opposed 180° space oriented arms of adjacent elements being conductively connected at said end portions.

16. A slow wave structure for supporting microwave energy comprising a plurality of periodically spaced generally X-shaped conductive elements, said X-shaped conductive elements being conductively connected at predetermined portions thereof, each of said plurality of generally X-shaped conductive elements having four 90° space rotated arms depending from a central portion, each of said generally X-shaped conductive elements having an aperture in said central portion which is located at the point of intersection of the axes of said four arms, said apertures of each of said generally X-shaped elements being aligned along the longitudinal axis of said slow wave structure, two 180° space oriented arms of each generally X-shaped element being conductively connected with two mutually opposed 180° space oriented arms of an adjacent X-shaped element, said interconnected arms being bent out of the respective planes of said X-shaped elements as defined by the planes of the defining boundary of said centrally located aperture of each of said generally X-shaped elements.

17. A slow wave circuit for microwave energy comprising an array of cruciform elements symmetrically disposed about and defining a longitudinal axis, said cruciform elements being axially displaced from each other along said longitudinal axis, each of said array of cruciform elements being connected to the respective adjacent cruciform elements disposed on opposite sides of said element at 90° space rotated end portions of the respective arms of said cruciform elements.

References Cited by the Examiner

UNITED STATES PATENTS

| | | | |
|---|---|---|---|
| 2,812,470 | 11/1957 | Cook et al. | 313—3.5 |
| 2,888,597 | 5/1959 | Dohler et al. | 315—3.5 |
| 2,888,598 | 5/1959 | Palluel | 315—3.6 |
| 2,952,795 | 9/1960 | Craig et al. | 315—3.5 |
| 3,086,180 | 4/1963 | Arnaud et al. | 333—31 |

HERMAN KARL SAALBACH, *Primary Examiner.*

R. D. COHN, *Assistant Examiner.*